(12) United States Patent
Khosrowyar

(10) Patent No.: US 6,964,729 B1
(45) Date of Patent: Nov. 15, 2005

(54) OXIDIZING UNDESIRED COMPOUNDS RESIDENT WITHIN LIQUID ABSORBENT COMPOUNDS, REDUCING ATMOSPHERIC POLLUTION, REGENERATING A LIQUID ABSORBENT AND CONSERVING FUEL USAGE ASSOCIATED WITH REBOILER UTILIZATION

(76) Inventor: Parviz Khosrowyar, 1007 E. Admiral Blvd., Tulsa, OK (US) 74120-1354

( * ) Notice: Subject to any disclaimer, the term of this patent is extended or adjusted under 35 U.S.C. 154(b) by 458 days.

(21) Appl. No.: 09/655,269

(22) Filed: Sep. 5, 2000

(51) Int. Cl.$^7$ ............................ B01D 19/00; B01D 5/00
(52) U.S. Cl. ............................ 203/18; 95/178; 95/179; 95/184; 95/209; 95/231; 95/239
(58) Field of Search ............................ 431/5; 588/213, 588/216; 203/18, 39, 40, 71; 423/245.3; 95/178, 179, 184, 193, 237, 239, 209, 231

(56) References Cited

U.S. PATENT DOCUMENTS

| | | | |
|---|---|---|---|
| 3,864,103 A | * 2/1975 | Tuckett et al. ............... 95/194 |
| 3,867,112 A | * 2/1975 | Honerkamp et al. ........... 203/18 |
| 4,085,199 A | * 4/1978 | Singleton et al. ........ 423/574.1 |
| 4,182,659 A | * 1/1980 | Anwer et al. ............... 203/18 |
| 4,322,265 A | 3/1982 | Wood ............................ 159/47 |
| 4,370,236 A | 1/1983 | Ferguson ..................... 210/634 |
| 4,434,034 A | 2/1984 | Padilla ........................ 202/153 |
| 5,141,536 A | * 8/1992 | Schievelbein et al. ......... 96/242 |
| 5,163,981 A | * 11/1992 | Choi ............................ 95/209 |
| 5,167,675 A | * 12/1992 | Rhodes ........................ 95/156 |
| 5,209,762 A | * 5/1993 | Lowell ........................ 95/192 |
| 5,221,523 A | 6/1993 | Miles et al. ................. 422/182 |
| 5,234,552 A | 8/1993 | McGrew et al. .............. 203/18 |
| 5,352,115 A | 10/1994 | Klobucar ..................... 432/181 |
| 5,520,723 A | 5/1996 | Jones, Jr. .................... 95/161 |
| 5,665,144 A | * 9/1997 | Hill et al. .................... 95/179 |
| 5,755,969 A | 5/1998 | Okamoto ..................... 210/691 |
| 5,766,313 A | 6/1998 | Heath ........................... 95/161 |

(Continued)

*Primary Examiner*—Stanley S. Silverman
*Assistant Examiner*—Peter J Lish
(74) *Attorney, Agent, or Firm*—Head, Johnson & Kachigian

(57) ABSTRACT

An improved method and apparatus for oxidizing undesired compounds residing within a liquid glycol based absorbent wherein the compounds are heated within a reboiler chamber to their boiling point to effectuate production of vaporized effluents. The absorbent's vaporized effluents rise upwardly exiting the reboiler chamber and enter a reflux tower wherein they are partially condensed via a condenser embodied within the interior of the tower. The residual uncondensed effluents are then transported to and first heated via a vaporizer/heat exchanger, thus effectuating the vaporization of any ambient condensed liquids contained within the effluents. The revaporized effluents then enter the invention's thermal oxidizer combustion chamber where they are second heated to a temperature necessary to effectuate destruction of undesirable compounds, such as but not limited to benzene, toluene and xylene. A temperature control throttling mechanism throttles the introduction of supplemental gas as necessary to maintain the temperature necessary to effectuate and maintain destruction of undesirable compounds. The combustion chamber is in fluid communication with a plurality of tubes which pass through the reboiler. The tube bundle generates external tube surface temperatures sufficient to raise a liquid glycol based absorbent in contact therewith to its boiling point. The second heated effluents are then introduced to and through a thermal oxidizer vent stack allowing for the exiting of said effluents. Venting mechanisms located in the invention's still/reflux tower and oxidizer vent stack are controlled in a coordinated manner to ensure temperature consistency of effluents traversing the invention's internal combustion chamber and tube bundle.

7 Claims, 5 Drawing Sheets

U.S. PATENT DOCUMENTS

| | | | |
|---|---|---|---|
| 5,824,836 A | 10/1998 | Becquet | 585/800 |
| 5,993,608 A * | 11/1999 | Abry et al. | 203/11 |
| 6,010,674 A * | 1/2000 | Miles et al. | 423/245.3 |
| 6,183,540 B1 * | 2/2001 | Thonsgaard | 95/166 |
| 6,251,166 B1 * | 6/2001 | Anderson | 95/166 |
| 6,265,625 B1 * | 7/2001 | Vansant et al. | 568/868 |
| 6,375,806 B1 * | 4/2002 | Hicks | 203/18 |
| 6,485,292 B1 * | 11/2002 | Rhodes et al. | 431/202 |

* cited by examiner

US 6,964,729 B1

OXIDIZING UNDESIRED COMPOUNDS RESIDENT WITHIN LIQUID ABSORBENT COMPOUNDS, REDUCING ATMOSPHERIC POLLUTION, REGENERATING A LIQUID ABSORBENT AND CONSERVING FUEL USAGE ASSOCIATED WITH REBOILER UTILIZATION

REFERENCE TO PENDING APPLICATIONS

This application is not related to any pending applications.

REFERENCE TO MICROFICHE APPENDIX

This application is not referenced in any microfiche appendix.

TECHNICAL FIELD OF THE INVENTION

The present invention relates generally to regenerative thermal oxidizers for natural gas processing equipment. In particular, the present invention relates to an improved method and apparatus which oxidizes undesirable compounds residing within a liquid glycol based absorbent, regenerates said absorbent, reduces atmospheric pollution and conserves supplemental fuel consumption.

BACKGROUND OF THE INVENTION

In 1990, the U.S. government issued the Clean Air Act Amendment (CAAA) listing 189 hazardous air pollutants (HAPS). Hydrocarbons are among the contaminants listed, most notably the aromatics (benzene, toluene, ethyl benzene, and xylene) a.k.a. BTEXs causing a tremendous impact to the triethylene glycol (a.k.a. "TEG") dehydration industry. All other light hydrocarbons are considered contaminants and combined with BTEX's, are classified as volatile organic compounds (VOC's) or total hydrocarbons (THC's).

Contaminants:

Glycol, as a hydrocarbon derivative (related alcohol compound), has an affinity for absorbing hydrocarbons. Present art glycol dehydration systems utilize a contactor tower to exchange natural gas and glycol under pressure. When natural gas is being dehydrated in a contactor, a certain percentage of it is absorbed into the glycol. This includes BTEX's and other hydrocarbons (e.g. paraffins, olefins, etc.). BTEX's are a primary concern because they have been classified as a carcinogen. Typical BTEX concentration in natural gas streams have been reported to range from <100 to 1000 ppmv.

Contaminant Sources:

In a typical present art glycol dehydration system there are three main sources for atmospheric contaminants:

Reboiler Exhaust: Reboiler exhaust of present art systems (stack) releases combustion byproducts to the atmosphere. The potential CAAA listed contaminants from these byproducts are NOx, CO, and VOC's.

Flash Tank Vent Gas: The glycol regeneration unit flash tank of present systems is designed to separate natural gas from the rich glycol stream. This occurs when a rich glycol stream pressure is decreased from a contactor operating pressure to a flash tank pressure (typically 50–75 psig). The potential CAAA contaminants are VOC's. The vent gas from the flash tank can be transported to a reboiler still column for eventual oxidation.

Reboiler Still Effluent:

In present art systems, a glycol regeneration reboiler's primary purpose is to vaporize absorbed water to regenerate glycol. There is, however, still some of the hydrocarbons present in the glycol solution after leaving the flash tank which will vaporize in the reboiler. All of the vaporized products exit the glycol still column and are typically released to the atmosphere. If stripping gas is required, it also exits the still column with vaporized water and hydrocarbons.

Attempts to reduce or eliminate the emission of undesirable compounds associated with glycol dehydration units and processes are known and represented in the art. For example:

U.S. Pat. No. 5,234,552 issued on Aug. 10, 1993 to Robert McGrew and John P. Broussard discloses a vapor condenser connected to a glycol reboiler to prevent emissions of aromatic compounds from glycol dehydration from escaping into the atmosphere. Steam and vaporized hydrocarbons are directed into the vapor condenser where they are sprayed with 80° F. or below water. The water spray cools the steam and vaporized hydrocarbons so that a substantial portion of the vapors are changed to a liquid phase which is collected in an accumulator located below the vapor condenser. A water jacket surrounding a central cylinder of the vapor condenser tends to keep the condensed vapors in the liquid phase. The remaining vaporized hydrocarbons which are not condensed are drawn out of the accumulator and burned in a burner connected to the glycol reboiler. The steam and vaporized hydrocarbons in the glycol reboiler have an initial temperature in the range of 350° to 400° F.

U.S. Pat. No. 5,520,723 issued on May 28, 1996 to Robert Jones Jr. discloses a method and system for reducing emissions from glycol dehydrators which employ a vapor-liquid contactor operated under ambient conditions to treat the organic vapors and liquids exiting from a condenser attached to the vapor vent of the glycol reboiler. A stream of the organic liquids is passed to the top of the contactor and allowed to descend in counter-current relation to the upward moving gas introduced at the bottom portion of the contactor. Liquids containing a relatively high content of hydrocarbons may be recovered from the bottom of the contactor, and vapors having a reduced content of organic emissions can be emitted directly to the atmosphere from the top of the contactor.

U.S. Pat. No. 5,824,836 issued on Oct. 20, 1998 to James Becquet discloses a system for lowering the ambient temperature of a vapor being produced from a glycol dehydrator unit, as well as a system for reducing the emissions of BTEX. Generally, the system comprises a condenser for condensing the vapor into a fluid phase and a gas phase, and a storage tank, fluidly connected to the outlet of the condenser. The system will also contain a pump member, operatively associated with the storage tank, adapted for pumping the fluid phase from the storage tank; and, an activating member adapted for activating the pump means after the fluid phase reaches a predetermined level within the storage tank. The system will include as part of the condenser member a turbine associated with a roof, with the roof being generally positioned over the condenser coils so as to shade the condenser coils. A method of recovering hydrocarbons from a vapor phase as well as lowering the ambient temperature is also disclosed.

U.S. Pat. No. 5,766,313 issued on Jun. 16, 1998 to Rodney Heath discloses an apparatus for treating emissions from a reboiler used to remove glycol from water laden glycol wherein the emissions are condensed; pressurized and separated so that hydrocarbon vapors may be directed to a burner used to supply heat to a reboiler. Control apparatus is provided to combine fuel gas and the pressurized hydrocarbon vapors as needed to supply all of the fuel required by the burner. Also, separate apparatus is provided to control the movement of dry glycol in the apparatus and to pressurize the condensed emissions.

U.S. Pat. No. 5,352,115 issued on Oct. 4, 1994 to Joseph M. Klobucar, subsequently assigned to Durr Industries, Inc. discloses a regenerative thermal oxidizer having regenerative heat exchangers including a heat exchange column formed of a body which defines at least one entire flow passage through the heat exchanger. The heat exchanger column assists in purging residual gas to be cleaned from the heat exchanger prior to that regenerative heat exchanger moving into a mode where it receives the cleaned gas. This reduces inadvertent emissions of gas to be cleaned to the environment. In one embodiment, a monolithic body includes all of the flow passages. In a second embodiment, a plurality of blocks are utilized to form the heat exchanger column. In a third embodiment, a number of cylindrical tubes are utilized. The heat exchanger columns preferably have 70–80% of their surface area used as the flow passages.

U.S. Pat. No. 5,221,523 issued on Jun. 22, 1993 to Bert M. Miles and Gary W. Sams, subsequently assigned to National Tank Company, discloses a system for controlling organic contaminants released from a regenerator during the process of liquid dehydration of natural gas where contaminants are vaporized mixture from the regenerator to a heater, heating the vaporized mixture in the heater, conducting the vaporized mixture from the heater to a liquid collection chamber where suspended liquid particles are separated out from the vaporized mixture, drawing the vaporized mixture from the liquid chamber using fuel gas as an aspirator, mixing atmospheric air with the vaporized mixture, and combusting the vaporized mixture in order to incinerate the vaporized mixture.

Given the limitations of the present art, what is needed is an improved method and article of manufacture to facilitate a one-step process which completely, or near completely, oxidizes effluent vapors emanated from a glycol based regeneration boiler. The present invention improves upon the present art by so doing and further eliminates the need to dispose of contaminant residuals. The invention additionally improves upon the art by eliminating the need to contend with the inefficiencies and potential failure of intermediate separators and pumps employed with prior art systems. The present art purportedly condenses a majority of still effluents. However, such condensed liquid is itself a contaminant which must be disposed of in a controlled manner. By contrast, the controlled oxidizing chamber of the present invention insures oxidation of undesirable effluents is complete and allows the unit to function in a superior manner to flare systems of the present art which present design structures of considerably less combustion efficiency.

There also remains a need to utilize energy generated in the oxidation stage as heat energy for the regeneration reboiler.

BRIEF SUMMARY OF THE INVENTION

The present invention provides an apparatus and process which near completely oxidizes effluents comprised of undesirable combustible vapors and ambient condensed liquid. There are no residuals to dispose of, or intermediate separators and pumps to contend with. The controlled oxidizing chamber of the present invention oxidizer via temperature and forced draft burner controls ensures oxidation of effluents at a 99.0+% efficiency.

The present invention is directed to an improved method and apparatus for oxidizing undesired compounds residing within a liquid glycol based natural gas processing system. Vaporized effluents exiting a reboiler chamber contain a certain amount of benzene, toluene and other volatile organic compounds (VOC's). Prior to entering the thermal oxidizer chamber of the instant invention, vapor outflow from a still column, which may be embodied as a reflux column, connected to the reboiler chamber is passed into and through a vaporizing heat exchanger which serves to revaporize any liquid in the outflow from the still/reflux column. By reducing the liquid inflow to the oxidizing chamber of the instant invention (or retaining the vapor form) oxidation is enhanced. A second feature of the heat exchanger is that it will contain a reservoir to contain any surges of liquid. Notwithstanding the fact that outflow from the still/reflux column should contain only water vapor and hydrocarbons, there are occasionally surges of liquid as the outflow from the vapor outlet is not steady state, but constantly changing. Once the vapor has passed through the vaporizing heat exchanger, it is directed to an inlet of the invention's thermal oxidizer combustion chamber. The oxidizer chamber contains a burner and also contains sufficient insulation to retain heat and encourage oxidization. Where the vaporizing heat exchanger is located adjacent the oxidizer, insulation can be reduced or removed to enhance heat exchange.

Vaporized effluents are introduced into the oxidizer combustion chamber and then heated to a minimum temperature of 1500–1600° F., with such temperature maintained for exiting flue gas (oxidized products) via a temperature control throttling the supplemental fuel gas flow. The design of the instant invention's combustion chamber ensures the oxidation process is complete. As known to those skilled in the art, proper residence time and chamber design to accommodate such residence time, can be calculated based on the speed of flame propagation for the combustible vapors.

The oxidizing combustion chamber is internally insulated to allow use of metals such as, but not limited to, carbon steel to be used as the shell or casing material with a specially designed reduced diameter section (throat) in the combustion chamber further enhancing the mixing process. This reduced diameter structure promotes more intimate contact between the combustibles and oxygen for a homogeneous solution. A combustion air blower provides a required air flow rate, and flue gas exit temperature is controlled by a temperature controller which controls fuel gas to the burner. These coordinated controls assure that required temperature will be maintained when the contaminant level in the foul inlet gas is low.

The flue gas exits the combustion chamber at 90° angle to the burner combustion products flow axis. This redirection in flow serves as yet an additional mixing mechanism to improve the oxidation efficiency.

Flue gas rising within a stack attached to the oxidizing chamber is also available to provide heat to a rich glycol absorbent prior to its introduction to the invention's reboiler. Such preheating is facilitated via a heat exchanger between the rich glycol and flue gas.

In its preferred embodiment, the invention's thermal oxidizer combustion chamber is integral with the glycol reboiler and surge tank. In an easily envisioned alternative embodiment, the thermal oxidizer combustion chamber is housed with the reboiler only and the surge/storage tank is a separate vessel.

An objective of the instant invention is to provide an apparatus and one step process by which glycol still effluent vapor and ambient condensed liquids are completely oxidized.

A further objective of the instant invention is to provide an oxidation process sufficient to eliminate the need to dispose of residual contaminants.

It is yet another objective of the instant invention to provide an apparatus and process by which intermediate flash tank and cold glycol to glycol heat exchanger(s) with present art glycol dehydration systems may be eliminated.

An additional object of the instant invention is to reduce fuel costs associated with prior art dehydration systems by providing a secondary fuel source comprised essentially of vaporized effluents.

It is yet a further objective of the instant invention is to provide an apparatus which may be easily retrofitted to any existing glycol dehydration unit.

Another objective of the instant invention is to regenerate a liquid glycol based absorbent to increase its glycol concentration.

A further object of the instant invention is to preheat incoming effluent via exiting combustion products to ensure any ambient condensed liquid is revaporized.

It is a further object and purpose of the present invention to utilize energy generated in the oxidation stage as heat energy for the glycol regeneration reboiler.

Other objects and further scope of the applicability of the present invention will become apparent from the detailed description to follow, taken in conjunction with the accompanying drawings wherein like parts are designated by like reference numerals.

DETAILED DESCRIPTION OF THE PREFERRED EMBODIMENT

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Figure 1:
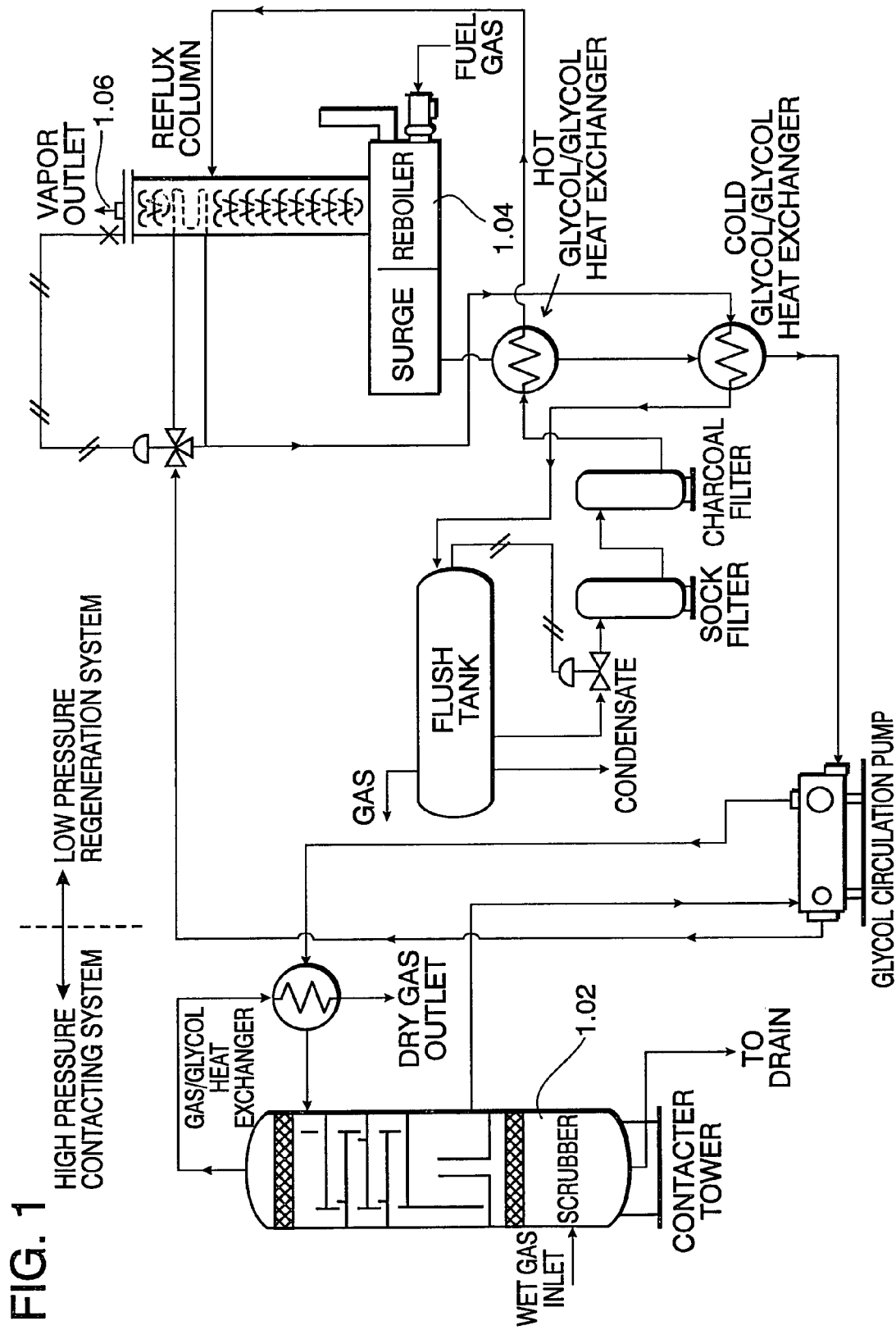
FIG. 1 is a typical system schematic illustrating constituent components of a glycol dehydrating system which removes water from natural gas prior to the introduction of the present invention.

FIG. 1 is a system schematic illustrating constituent components of a typical glycol dehydrating system which removes water from natural gas prior to the introduction of the present invention. In FIG. 1, a liquid glycol based absorbent, such as but not limited to triethylene glycol or TEG, ethylene glycol, diethylene glycol, tetraethylene glycol or glycerin is passed in exchange with natural gas. The natural gas is dehydrated in a contactor tower 1.02. A certain percentage of natural gas is absorbed into the glycol. A reboiler 1.04 is utilized to drive off absorbed water from the glycol with effluent vapors exiting the reboiler 1.04 at arrow 1.06 containing a certain amount of volatile organic compounds (VOCs) including but not limited to benzene, xylene and toluene. Various configurations are known for contemporary glycol dehydration systems which include various pumps, skimmers and filters.

There are several methods known to reduce the emission of these vaporized effluents. In one alternative, a further condenser/vapor recovery system is utilized. Another option is a vertical flaring of said emissions via air intake and burners. The present invention utilizes a thermal oxidizer to eliminate said vaporized effluents. While oxidizers have been utilized in the passed, the present invention is a modification and improvement over existing oxidizers and is disclosed in association with FIGS. 2 and 3.

Also, in prior art systems, an external source of fuel gas is delivered to the reboiler as a fuel source for a burner for the boiler. The present invention eliminates this fuel gas source and burner as well as NOX and CO the burner would produce.

Figure 2:
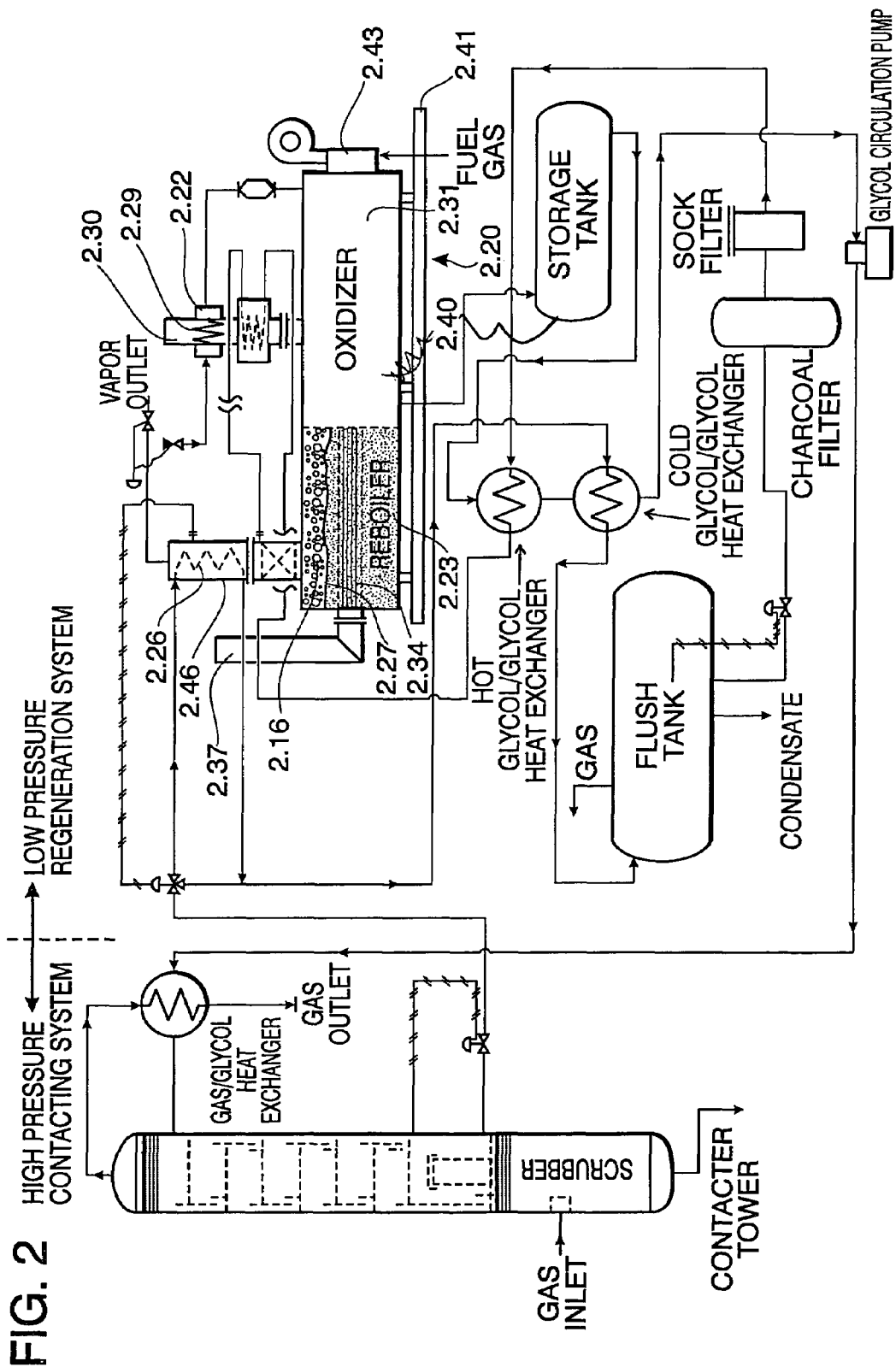
FIG. 2 illustrates the thermal oxidizer of the instant invention positioned within the existing footprint of reboilers utilized in conjunction with present art glycol dehydration systems.

FIG. 2 illustrates the thermal oxidizer of the instant invention (hereinafter referred to synonymously as "RegeneDizer") as positioned within the existing footprint of a reboiler utilized in conjunction with typical glycol dehydration systems. Prior to entering the oxidizer combustion chamber 2.31 of the instant invention, vaporized effluents 2.16 rise within the invention's reboiler chamber 2.23 and enter a still column which may be embodied as a reflux tower 2.46 containing a condenser means 2.26. Uncondensed effluents exit the still tower 2.46 and enter into and through a vaporizer/heat exchanger 2.29 located in a thermal oxidizer vent stack 2.30 which serves to revaporize any liquid in the effluent outflow from the still/reflux tower 2.46. Heat generated from the vaporizer/heat exchanger 2.29 acts to retain the effluent outflow in vapor form. Once the vapor is passed through the vaporizer/heat exchanger 2.29 it is next directed into the oxidizer combustion chamber 2.31 of the instant invention. The oxidizer chamber 2.31 contains a burner 2.43 and sufficient insulation 3.62 (FIG. 3) to retain heat and encourage oxidation.

As illustrated in FIG. 2, the instant invention comprises in combination a reboiler chamber 2.23 wherein a liquid glycol based absorbent 2.27 is heated to its boiling temperature to produce vaporized effluents 2.16. A condenser 2.26 wherein said vaporized effluents 2.16 are partially condensed, a vaporizer/heat exchanger 2.29 embodied within a thermal oxidizer vent stack 2.30 wherein said vaporized effluents are first heated to re-vaporize ambient condensed fluids, a reservoir 2.22 in communication with said vaporizer/heat exchanger 2.29 to contain surges of liquid, a thermal oxidizer combustion chamber 2.31 wherein said effluents are second heated to a temperature necessary to effectuate destruction of undesirable compounds, a heat recovery tube bundle 2.34 wherein the external surface area and temperature of said heat tube bundle 2.34 are sufficient to raise a liquid glycol based absorbent in contact therewith to said absorbent's boiling temperature, a reboiler vent stack 2.37 from within which said second heated effluent may be vented into the atmosphere, a skid support structure 2.41 upon which to be mounted or otherwise affixed, and a surge storage tank 2.40 wherein said absorbent having yielded said vaporized effluent may be deposited.

Figure 3:
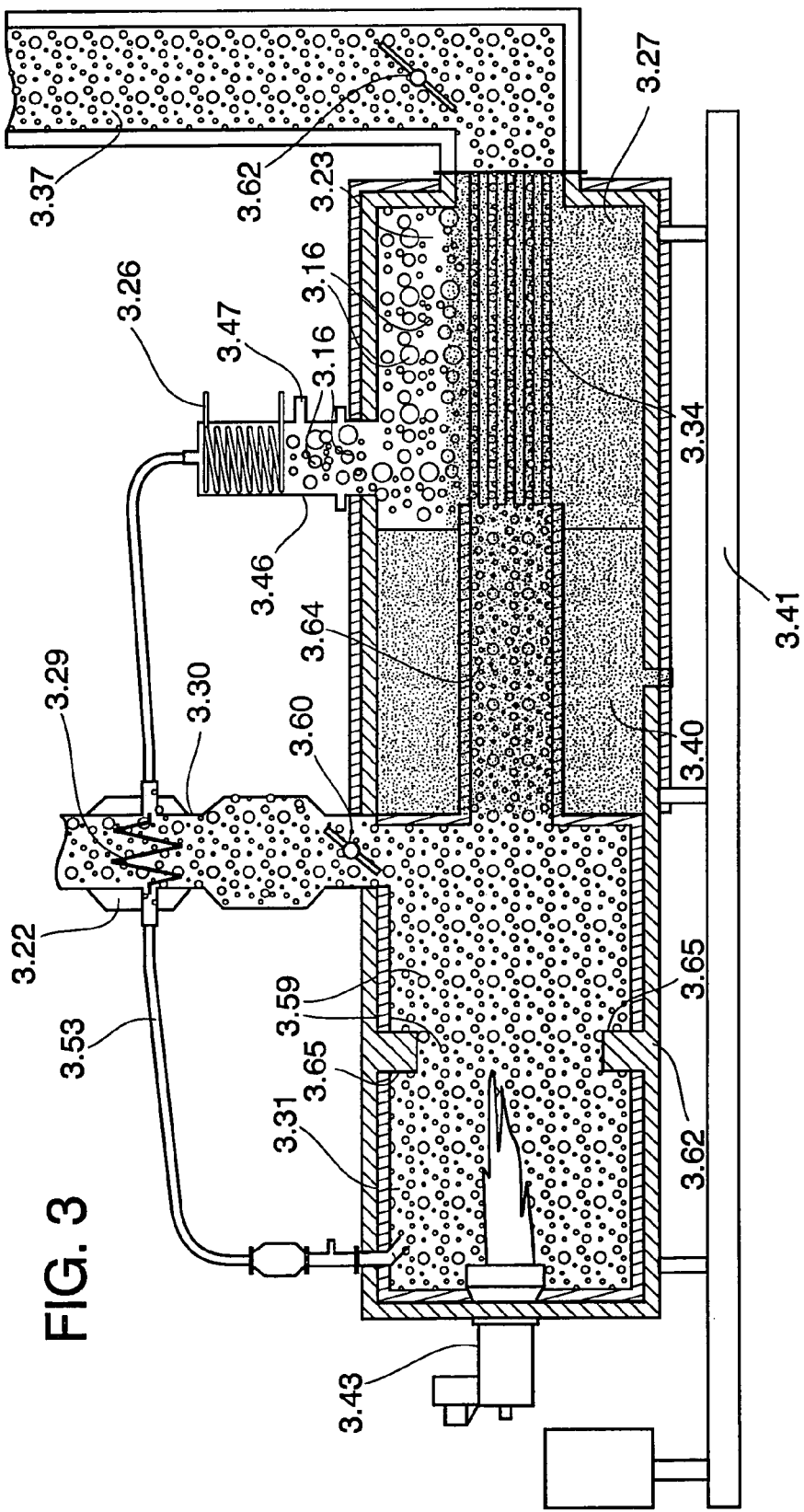
FIG. 3 provides a detailed cross-sectional diagram which illustrates further detail of the invention's internal components as practiced in a preferred embodiment.

FIG. 3 provides a detailed cross-sectional diagram which illustrates further detail of the invention's internal components as practiced in its preferred embodiment.

In FIG. 3, a liquid glycol based absorbent 3.27 containing undesirable compounds is heated within a reboiler chamber 3.23 to its boiling point. Said heating effectuates the production of vaporized effluents 3.16. The glycol based absorbent 3.27 is first introduced to said reboiling chamber 3.23 via an entry port 3.47. According to FIG. 3, the entry port 3.47 for the glycol based absorbent 3.16 is incorporated within a still/reflux tower 3.46 when practicing the invention in its preferred embodiment. However, the entry port 3.47 may be located elsewhere to allow for the entry of said absorbent 3.27 to the invention's reboiler chamber 3.23. The vaporized effluents 3.16 rise upwardly exiting the reboiler chamber 3.23 and entering the still/reflux tower 3.46 wherein they are partially condensed via a condenser means 3.26 embodied within the interior of said still/reflux tower 3.46. The uncondensed effluents are then transported to and first heated via a vaporizer/heat exchanger 3.29 located within the internal portion of a thermal oxidizer chamber vent stack 3.30. Said first heating revaporizing any ambient condensed liquids contained within said vaporized effluents. A reservoir 3.22 is integrated with said vaporizer/heat exchanger 3.29 to contain any surges of liquid accompanying said partially condensed effluents. The revaporized effluents 3.53 are then transported and introduced to the invention's thermal oxidizer combustion chamber 3.31 where they are second heated to a temperature necessary to effectuate destruction of undesirable compounds, such as, but not limited to, benzene, toluene, and xylene. The temperature necessary to effectuate destruction of said undesirable compounds through extensive testing has been found to require a minimum temperature between 1500° F.–1600° F. The thermal oxidizer combustion chamber 3.31 includes a burner 3.43 fed as necessary by supplemental fuel, such as but not limited to, natural gas. The quantity of flue gas entering the heat recovery section is controlled by a temperature controller in the reboiler, which sets the control valves (or shutters, or dampers, etc.) in the vent stacks in position for the required flow. A temperature control throttling mechanism well known and practiced in the art throttles the introduction of such supplemental fuel gas flow as necessary to maintain the afore stated minimum temperature. The combustion chamber is also designed for proper residence time of said heated effluents to insure the oxidation process is complete. As known to those skilled in the art, proper residence time and chamber design to accommodate such residence time, can be calculated based on the speed of flame propagation for the combustible vapors. Insulation 3.62 located within the internal portion of the invention's combustion chamber 3.31 allows use of various metals as casing or shell material for the invention. A reduced diameter section 3.65 (synonymously referred to as "throat") of the combustion chamber 3.31 enhances the mixing process of effluents traversing the chamber. Said reduced diameter section 3.64 occurring generally half way along the horizontal axis of said combustion chamber 3.31.

Continuing with FIG. 3. Second heated effluents 3.59 then traverse an optional reduced diameter section 3.64 of the combustion chamber 3.31 to, and through, the internal portions of a heat recovery tube bundle 3.34. The words "tube bundle" as used herein is generic in nature and refers to a heat transfer system in which a hot medium is separated from the cooler medium by multiple tubes or pipes, coils or plates. The tube bundle is made removable to permit repair and/or replacement. Said traversing of said tube bundle 3.34 effectuates external tube surface temperatures sufficient to raise a liquid glycol based absorbent 3.27 in contact therewith to its boiling temperature. Once traversing, the tube bundle 3.34 said second heated effluents 3.59 are then introduced to, and through, a reboiler vent stack 3.37. Such introduction and traversing of said second heated effluents 3.59 through the reboiler vent stack 3.37 allow for the exiting of said effluents at an approximate 90° angle thus effectuating a redirection and flow which serves as an additional mechanism to improve oxidation efficiency.

Also illustrated in FIG. 3 are venting mechanisms (3.60, 3.62) commonly known and practiced by to those skilled in the art located in the oxidizer vent stack 3.30 and invention's reboiler stack 3.37. Said venting mechanisms (3.60, 3.62) are controlled in a coordinated manner known to those skilled in the art with respect to the utilization of venting mechanisms to effectuate consistency of internal combustion chamber and tube bundle temperatures.

Specifically, said venting mechanisms (3.60, 3.62) may be actuated whereby the venting mechanism located in the oxidizer vent stack 3.60 may be closed and the vent mechanism of the reboiler vent stack 3.62 may be open to induce greater heat absorption by the tube bundle 3.34. In contrast, the partial or complete closing of the venting mechanism in the reboiler vent stack 3.62 and the opening of the vent mechanism in the oxidizer vent stack 3.60 would effectuate a lowering of temperature and heat transference to said tube bundle 3.34. Methods of calculating the required heat transfer area, number of tubes and tube dimensions are well known to those skilled in the art and are readily available in publication form including *"Introduction To Heat Transfer"*, Brown and Marco; *"Process Heat Transfer"*, Kern; *"Heat Transmission"*, McAdams; and *"Crane Technical Paper 410"*.

In practical application, however, said venting mechanisms (3.60, 3.62) will be coordinated in such a manner so as to induce a partially open or partially closed positioning of both venting apparatuses so as to induce consistency with respect to temperatures of second heated effluents 3.59 traversing said oxidizing chamber, tube bundle 3.34 and reboiler vent stack 3.37.

Lean glycol exits the reboiler 3.23 into the surge (or storage) tank 3.40, which may be integrated with the reboiler 3.27 and thermal oxidizer combustion chamber 3.31 of the present invention, or may be a separate vessel. If it is integrated with the reboiler 3.27 and thermal oxidizer combustion chamber 3.31 a passage (pipe or other means) is provided in the surge tank 3.40 to direct second heated effluents into the heat recovery tube bundle 3.34. Such passage may be insulated to preclude any significant heat transfer from the hot gases into the lean glycol.

The lean glycol concentration leaving the reboiler is dependant on the temperature and pressure in the reboiler. For example, triethylene glycol boiling at 400° F., atmosphere pressure has a concentration of approximately 99 wgt. % TEG, 1% water (other glycols and other concentrations boil at different temperatures).

Figure 4:
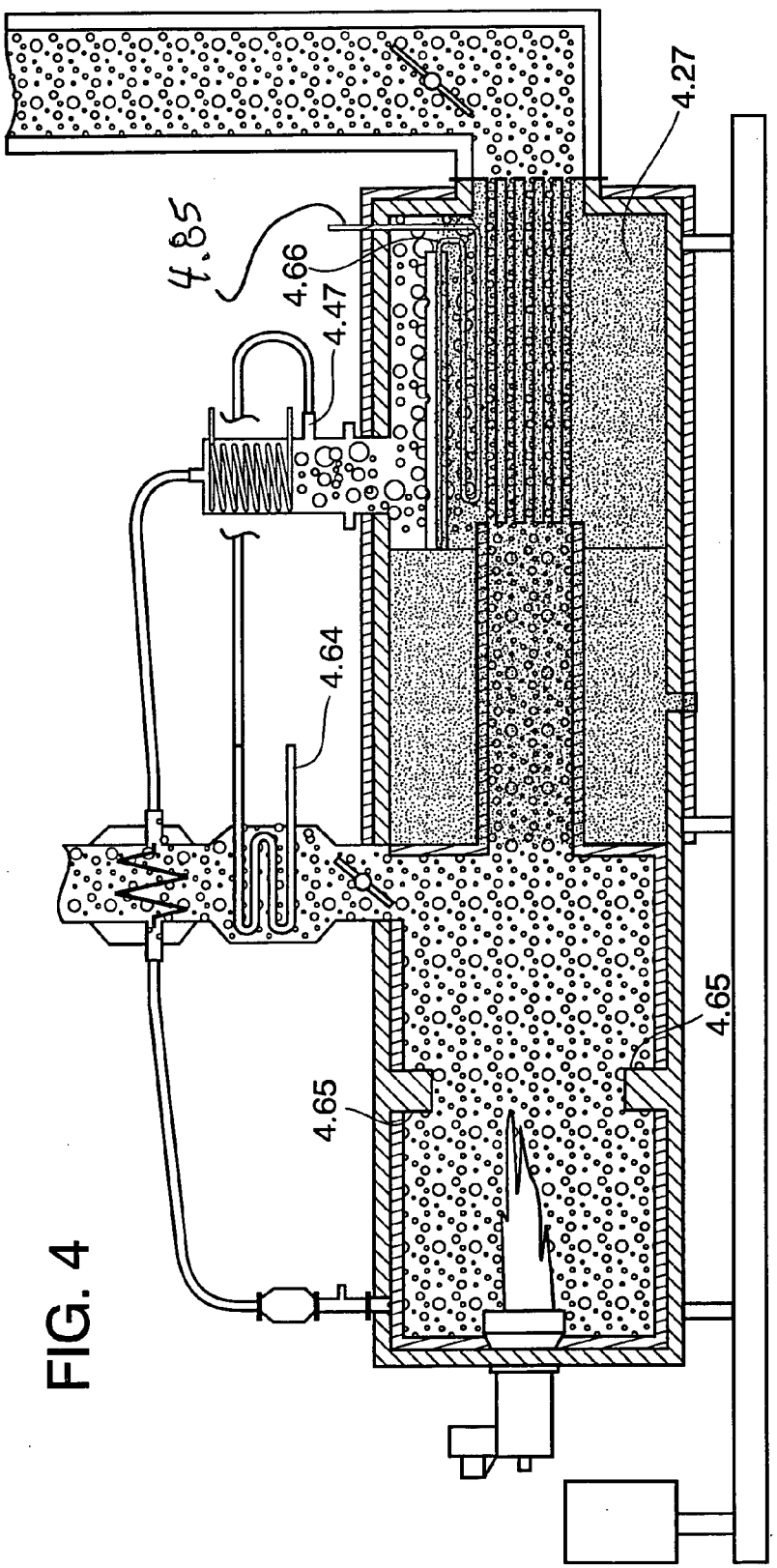
FIG. 4 illustrates a cross-sectional diagram of the instant invention as practiced in an alternative embodiment which comprises an optional glycol heat recovery section and further optional sparging or stripping pipe.
Figure 5:
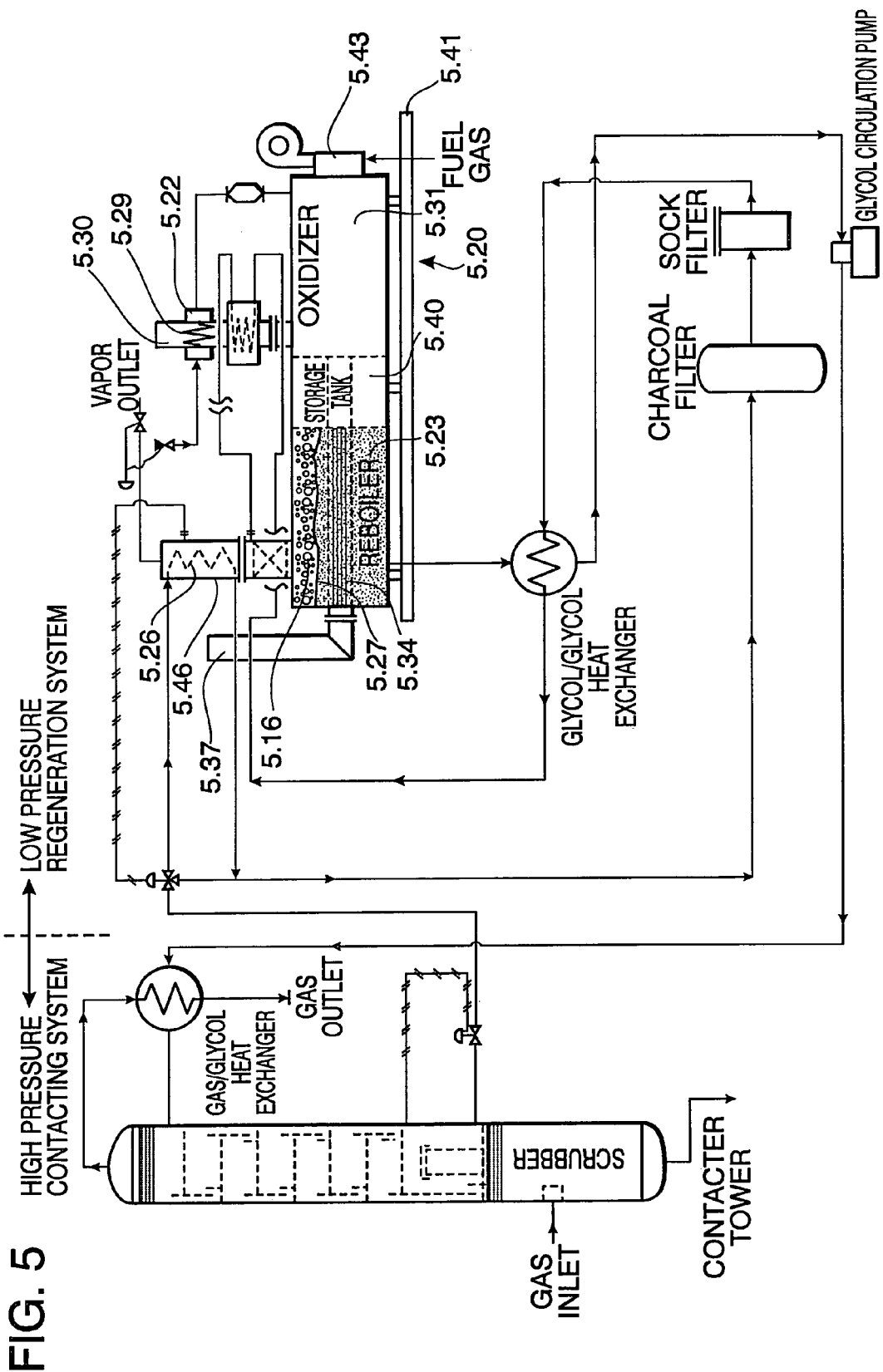
FIG. 5 is an illustration of the instant invention as practiced when eliminating intermediate separators and pumps associated with present art glycol dehydration systems.

FIG. 4 illustrates a cross-sectional diagram of the instant invention as practiced in an alternative embodiment which comprises an optional glycol heat recovery section 4.64 and further optional sparging or stripping pipe 4.66. Turning now to FIG. 4.

In FIG. 4 an optional heat exchanger 4.64 is shown through which a liquid glycol based absorbent containing undesirable compounds is first introduced and routed prior to entering the reboiler section of the instant invention 4.27, via input port 4.47.

A higher concentration of glycol required for a dehydration system is sometimes desired. This higher concentration can be obtained by contacting the reboiler regenerated glycol with a suitable gas (sparging or stripping gas) which vaporizes and removes part of the residual water in the glycol. For triethylene glycol having the reboiler at 400° F., atmospheric pressure, and then contacting with stripping gas, the concentration can be increased to 99.95 wgt % TEG, depending on the flow rate or stripping gas and efficiency of contact between the glycol and gas.

In the present invention, the gas-glycol contact is accomplished in a horizontal tube (or pipe) called the sparging or stripping tube (or pipe) 4.66. Thermally regenerated lean glycol enters the sparging or stripping tube 4.66. Stripping gas flows through a pipe 4.85 (flow rate and/or pressure may be controlled) into the reboiler, passes through a heating tube submerged in the boiling glycol, and enters a distributor pipe inside the sparging or stripping pipe 4.66. This distribution pipe is provided with holes to permit the stripping gas to pass from the distributor pipe into the sparging or stripping pipe.

The glycol flows through the sparging or stripping pipe 4.66 at a controlled level (depth). The stripping gas, leaving the holes in the stripping pipe, bubbles through the glycol, vaporizing and removing some of the residual water. The stripping gas exits the top of the sparging or stripping pipe, flows into the still column, and exits the top of the still column with other gases and vapors which have removed from the inlet rich glycol.

The degree of increase in the glycol concentration depends on the length of the sparger pipe 4.66, the flow rate of the stripping gas, the temperature of the system, and depth of glycol in the sparger pipe, and size, quantity and location of the holes in the stripping gas pipe. Test data shows this to be an efficient, economical method of increasing the glycol concentration above normal reboiler conditions. For triethylene glycol, with reboiler operating at 400° F. atmospheric pressure, a stripping gas rate of 1 SCF/gal increased the glycol concentration to 99.6% and 2 SCF/gal increased the concentration to 99.8%. Higher concentration may be possible with a different glycol level and/or stripping gas distribution. The high concentration lean glycol exits the sparging or stripping pipe into the surge tank.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

ALTERNATE EMBODIMENTS

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An improved method of oxidizing undesirable compounds residing within a liquid based gas processing system comprising:

(a) first heating a liquid absorbent containing undesirable compounds within a reboiler chamber to its boiling temperature, which is a temperature above the boiling point of water and below the temperature of degradation of said absorbent, to produce vaporized effluents;

(b) condensing said effluents within a condenser;

(c) transporting residual uncondensed effluents to and through a vaporizer wherein said effluents are first heated to re-vaporize any ambient condensed liquids;

(d) transporting and introducing said re-vaporized effluents to a thermal oxidizer combustion chamber combined and integrated with said reboiler but fluidly separate therefrom wherein said re-vaporized effluents are second heated to a temperature necessary to effectuate virtually complete thermal destruction of undesirable compounds;

(e) transporting and introducing said thermally destroyed effluents from said thermal oxidizer combustion chamber to and through the internal portions of a heat recovery tube bundle, said introduction and transport generating external tube surface temperatures sufficient to raise a liquid glycol based absorbent in contact therewith to its boiling temperature;

(f) transporting said second heated effluent from said tube bundle to and through a reboiler vent stack; and (g) means to regulate said external tube surface temperatures by a controlled venting mechanism having a venting mechanism in a vent stack of said thermal oxidizer chamber coordinated with a vent mechanism in said reboiler vent stack.

2. The method as set forth in claim 1 wherein said absorbent is diethylene glycol.

3. The method as set forth in claim 1 wherein said absorbent is triethylene glycol (TEG).

4. The method as set forth in claim 1 wherein said absorbent is one of a group of absorbents including ethylene glycol, tetraethylene glycol or glycerin.

5. The method as set forth in claim 1 wherein said undesirable compounds include benzene, toluene, ethylbenzene and xylene.

6. The method of claim 1 further comprising the step of sparging said absorbent while said absorbent traverses the internal portion of a sparging or stripping pipe located within said reboiler.

7. The method of claim 1 wherein the transporting of said partially condensed effluents to and through a vaporizer means further comprises the step of collecting non-vaporized effluents in a reservoir.

* * * * *